US012679780B2

(12) United States Patent
Gedela et al.

(10) Patent No.: US 12,679,780 B2
(45) Date of Patent: Jul. 14, 2026

(54) PREPARATION OF GRAPHENE NANOSHEETS-BASED CONCRETE ADDITIVE

(71) Applicant: Nanospan India Private Limited, Hyderabad (IN)

(72) Inventors: Venkata Ramana Gedela, Hyderabad (IN); Ravi Nuguru, Hyderabad (IN); Chinthakuntla Ashok, Nalgonda (IN); Edulakanti Sai Ram, Medchal-Malkajgiri (IN); Jella Praveen Kumar, Nalgonda (IN)

(73) Assignee: Nanospan India Private Limited (IN)

( * ) Notice: Subject to any disclaimer, the term of this patent is extended or adjusted under 35 U.S.C. 154(b) by 803 days.

(21) Appl. No.: 18/056,734

(22) Filed: Nov. 18, 2022

(65) Prior Publication Data

US 2023/0159399 A1     May 25, 2023

(30) Foreign Application Priority Data

Nov. 19, 2021    (IN) ............................ 202141022461

(51) Int. Cl.
| | |
|---|---|
| *C04B 40/00* | (2006.01) |
| *C04B 14/02* | (2006.01) |
| *C04B 24/26* | (2006.01) |
| *C04B 103/20* | (2006.01) |
| *C04B 103/30* | (2006.01) |

(52) U.S. Cl.
CPC ........ *C04B 40/0046* (2013.01); *C04B 14/026* (2013.01); *C04B 24/2647* (2013.01); *C04B 2103/20* (2013.01); *C04B 2103/304* (2013.01)

(58) Field of Classification Search
CPC .................................................. C04B 40/0046
See application file for complete search history.

(56) References Cited

U.S. PATENT DOCUMENTS

2015/0240047 A1* 8/2015 Korzhenko ............. C04B 28/02
                                                                507/119

FOREIGN PATENT DOCUMENTS

WO     WO-2020078578 A1 * 4/2020 ........... C04B 14/386

* cited by examiner

*Primary Examiner* — Michael F Pepitone

(57) ABSTRACT

A method for preparing a graphene-nanosheets based concrete additive is disclosed. The method comprises mixing Polycarboxylate ether A (PCE-A) to a retarder-based salt solution to obtain a retarder-based Polycarboxylate ether A solution. In the next step, a retarder based PCE solution is obtained by adding Polycarboxylate ether B to the retarder based Polycarboxylate ether A solution to which graphene nanosheets are added. Further, an air entrainment agent is added to graphene nanosheets based PCE solution and further mixed to obtain the graphene nanosheets based concrete additive.

17 Claims, 3 Drawing Sheets

PREPARATION OF GRAPHENE NANOSHEETS-BASED CONCRETE ADDITIVE

BACKGROUND

Unless otherwise indicated herein, the materials described in this section are not prior art to the claims in this application and are not admitted to being prior art by inclusion in this section.

FIELD OF THE INVENTION

The subject matter in general relates to a concrete additive. More particularly, but not exclusively, the subject matter relates a method for preparation of graphene nanosheets based concrete additive.

DISCUSSION OF THE RELATED ART

Concrete refers to cement as a cementing material, and sand and stone as aggregate. In the present days most of the construction is made of concrete. Concretes are often subjected to harsh environmental conditions such as wind, sunlight, high temperature, low temperature and the like, hence the performance of the concrete under extreme environments needs to be protected or improved.

Conventionally, additives are used protect the concrete from harsh environmental conditions. Although the existing concrete additives are various in types, certain problems are associated with the existing additives such as lower compressive strength and has single function due to which various additives needs to be used to achieve different effects.

In view of the forgoing discussion, there is need of an improved concrete additive which has various functions such as improving the compressive strength and the flexural strength of the concrete among others.

SUMMARY

In an embodiment, a method for preparing a graphene-nanosheets based concrete additive is disclosed. The method comprises mixing Polycarboxylate ether-A (PCE-A) to a retarder-based salt solution to obtain a retarder-based Polycarboxylate ether-A (PCE-A) solution. In the next step, a retarder based PCE solution is obtained by adding Polycarboxylate ether-B (PCE-B) to the retarder based Polycarboxylate ether-A (PCE-A) solution to which graphene nanosheets are added. Further, an air entrainment agent is added to graphene nanosheets based PCE solution to obtain the graphene nanosheets based concrete additive.

In an embodiment an additive for concrete is disclosed. The additive for concrete comprises graphene nanosheets, Polycarboxylate ether-A (PCE-A), Polycarboxylate ether-B (PCE-B) and at least one retarder.

BRIEF DESCRIPTION OF DRAWINGS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Figure 1:
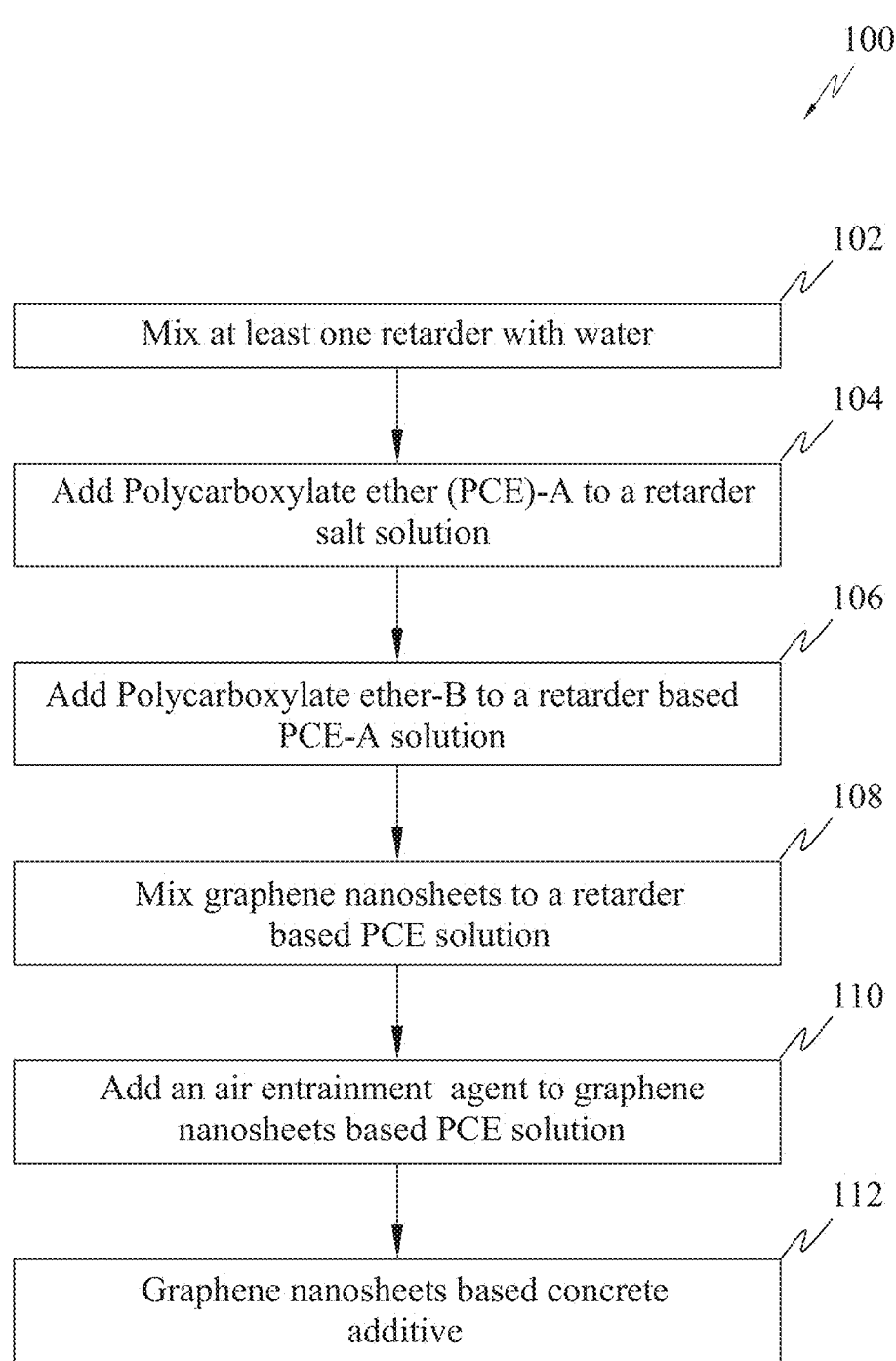
FIG. 1 illustrates a method flowchart 100 to prepare a graphene nanosheets based concrete additive, in accordance with an embodiment.

Referring to FIG. 1, a method 100 for preparing graphene nanosheets based concrete additive is provided, in accordance with an embodiment. The concrete additive or chemical admixture of the present invention involves incorporation of the graphene nanosheets to a polymer mainly poly carboxy late ether (PCE).

In an embodiment, at step 102, at least one retarder is mixed with water to form a retarder salt solution. Further, more than one retarder may also be mixed with water. The retarders that may be used in the present invention are organic retarders or inorganic retarders. The retarders added may be for example but not limited to sugar, sodium thiosulfate and sodium gluconate, among others which may effect the hardening of concrete. It shall be noted that any other retarders may also be used that serves the purpose of the present invention.

In an embodiment, the retarder is mixed with the water at a speed chosen between 600 rpm and 800 rpm (rotation per minute) for a time period chosen between 10 minutes and 15 minutes. The mixing is carried out in a mechanical stirrer or any mixing means that serves the purpose of the present invention.

In an embodiment, the weight percentage of the retarder is chosen between 3% and 5% of the total amount of water.

In an embodiment, one or more different types of superplasticizers may be added to the retarder-based salt solution. At step 104, a Polycarboxylate ether-A (PCE-A) is added to the retarder salt solution obtained at step 102 to form a retarder based Polycarboxylate ether-A (PCE-A) solution. It shall be noted that the PCE-A is not added immediately (added after some time) to the retarder-based salt solution formed by mixing the retarder with water. Upon addition of the PCE-A, the polymer chains react with water resulting in hydrolysis reaction.

In an embodiment, the retarder-based salt solution and the PCE-A are mixed at a speed chosen between 1200 rpm and 1500 rpm (rotation per minute) for a time period chosen between 10 minutes and 15 minutes. The mixing is carried out in a mechanical stirrer or any mixing means that serves the purpose of the present invention.

In an embodiment, the weight percentage of the PCE-A is chosen between 20% and 25% of the retarder-based salt solution.

At step 106, Polycarboxylate ether-B (PCE-B) is added to the retarder based PCE-A solution obtained at step 104. The retarder based PCE-A solution obtained at step 104 comprises water, at least one retarders and PCE-A.

In an embodiment, the Polycarboxylate ether-B (PCE-B) and the retarder based PCE-A solution are mixed to form a retarder based Polycarboxylate ether (PCE) solution. The mixing of the Polycarboxy late ether (PCE)-B and the retarder based PCE-A solution is carried out at a speed chosen between 1700 rpm and 2000 rpm (rotation per minute) for a time period chosen between 10 minutes and 15 minutes. The mixing is carried out in a stirrer for example a mechanical stirrer or any mixing means that serves the purpose of the present invention. Due to this mixing, polymerization takes place due to which smaller molecules (monomers or building blocks) are chemically combined to form larger molecules (polymer chains).

In an embodiment, the weight percentage of the PCE-B is chosen between 30% and 40% of the retarder based PCE-A solution.

At step 108, graphene nanosheets (GNS) and the retarder based PCE solution obtained at step 106 are mixed to form graphene nanosheets based PCE solution. The graphene nanosheets and the retarder based PCE solution are mixed in a shear mixture. It shall be noted that the PH of the retarder based PCE solution is checked prior to addition of the graphene nanosheets such that the PH is maintained between 6 and 7.

In an embodiment, the shear mixing is carried out at a speed chosen between 2500 rpm and 3000 rpm for a time period chosen between 30 minutes and 45 minutes.

In an embodiment, the weight percentage of the graphene nanosheets is chosen between 0.5% and 5% of the retarder based PCE solution.

In an embodiment, the surface area of the graphene nanosheets is chosen between 320 m$^2$/g and 550 m$^2$/g.

The nanosized GNS are uniformly distributed throughout the polymer chain obtained in step 106. That is to say, the pores in the polymer chain are completely filled with GNS.

In an embodiment, the graphene nanosheets used in the present invention is prepared by the method disclosed hereafter.

The graphene nanosheets is prepared by an aqueous-based exfoliation process from the raw materials such as exfoliated graphite (EG) or graphite.

In an embodiment, sodium cholate is dissolved in distilled water under stirring condition. In the next step, exfoliated graphene worms are shear mixed with sodium cholate solution at a speed chosen between 5000 rpm and 6000 rpm for one hour to four hours.

In the next step, a suspension obtained in the above step is kept at room temperature overnight. An upper solution from the suspension is collected and centrifuged at a speed chosen between 1000 rpm and 4000 rpm for 10 minutes to 40 minutes. The supernatant obtained by centrifugation is filtered and further dried to obtain the graphene nanosheets.

At step 110, at least one air entrainment agent is added to the graphene nanosheets based PCE solution. The air entrainment agent is not added immediately to the graphene based PCE solution but added after 45 minutes.

In embodiment, the weight percentage of the air entrainment agent is chosen between 0.5% and 1% of the graphene nanosheets based PCE solution.

In an embodiment, the air entrainment agent and the graphene nanosheets based PCE solution are mixed at a speed chosen between 2000 rpm-2300 rpm (rotation per minute) for a time-period chosen between 5 minutes and 10 minutes.

In an embodiment, the air entrainment agents may be for example but not limited to vinsol resin, rosin resin and alkyl sulfonate among others. It shall be noted that any other entrainment agents may also be used that serves the purpose of the present invention.

At step 112, the graphene nanosheets based concrete additive is obtained. The graphene nanosheets based concrete additive obtained is a black color solution.

Table 1 represents the chemical parameters of the graphene nanosheets based additive according to IS 9103 (1999).

| S. No. | Parameter | Specification |
|---|---|---|
| 1 | Appearance | Greyish Black |
| 2 | pH | 7 ± 1 |
| 3 | Specific gravity | 1.1-1.2 |
| 4 | Solid content (%) | 35-45 |
| 5 | Viscosity (cP) | 500-700 |

In an embodiment, the environment-friendly concrete additive disclosed in the embodiments of the present invention is more effective in improving the flexural strength and compressive strength of the concrete compared to the control sample as shown table 2. The control sample disclosed in table 2 comprises cement, water, coarse aggregate, fine aggregate, Vinsol Resin. The control sample does not comprise graphene nanosheets based concrete additive of the present invention, whereas the sample A or the test sample comprises the graphene nanosheets based concrete additive of the present invention in addition to the ingredients disclosed in the control sample.

TABLE 2

| Properties of hardened concrete | | |
|---|---|---|
| Test Performed | Control sample | Test sample comprising Graphene nanosheets based concrete additive (SAMPLE A) |
| Compressive strength (psi) | | |
| 1 day | 1560 | 2340 |
| 3 days | 2370 | 3400 |
| 7 days | 3040 | 4130 |
| 28 days | 4220 | 5040 |
| Flexural strength (psi) | | |
| 3 days | 400 | 495 |
| 7 days | 525 | 605 |
| 28 days | 640 | 715 |

In an embodiment, thermogravimetric analysis (TGA) study revealed that major degradation starts at 169° C. in polycarboxylate ether (PCE), whereas in Graphene nanosheets-PCE, the major degradation occurred at 195° C. This data indicates that thermal strength (aprox. 26° C.) increased in Graphene nanosheets—PCE when compared to PCE at the initial stage. In graphene nanosheets—PCE 15% of thermal strength was increased than PCE. Further, the PCE degraded to 50% at 335° C. whereas Graphene nanosheets-PCE degraded to only 20% at 335° C. This lower degradation is due to strong interaction between PCE and Graphene nanosheets which may prevent polymer chains from debundling and degradation, and significantly improving thermal stability. From this data it can be interpreted that that addition of Graphene nanosheets as a nanofiller increases the thermal strength stability of PCE.

Figure 2A:
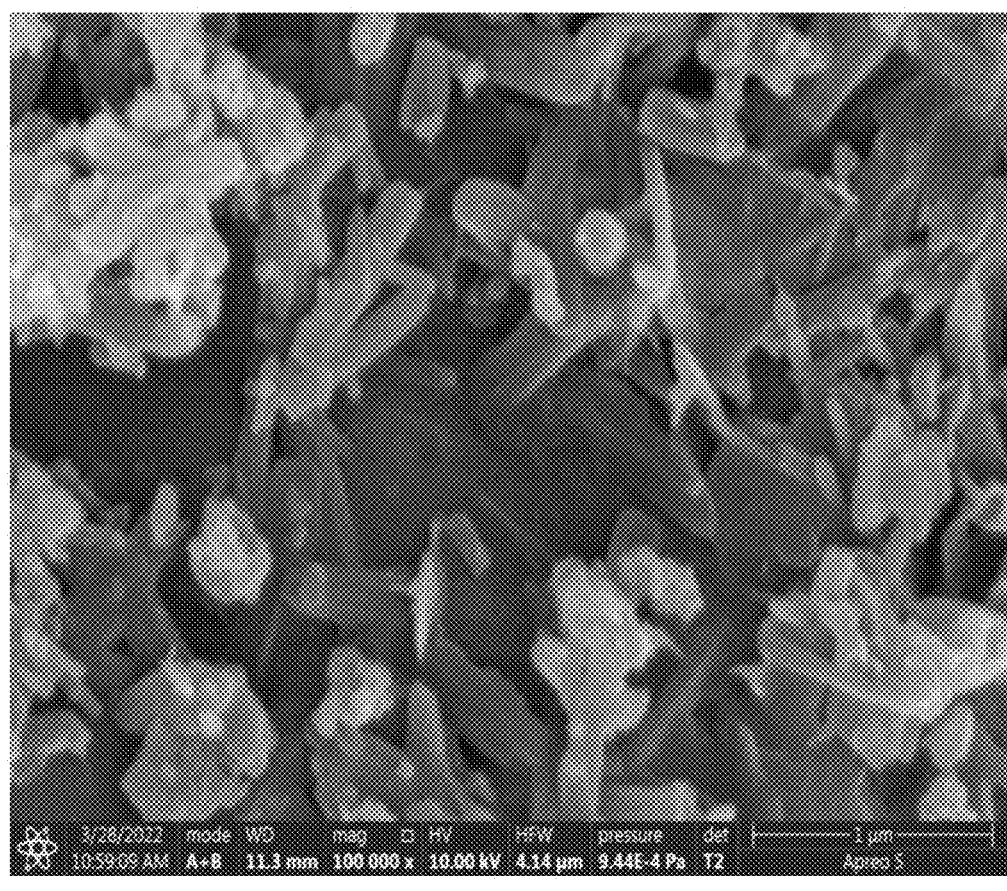
FIG. 2A is a SEM image of a cement concrete (control sample), in accordance with an embodiment.
Figure 2B:
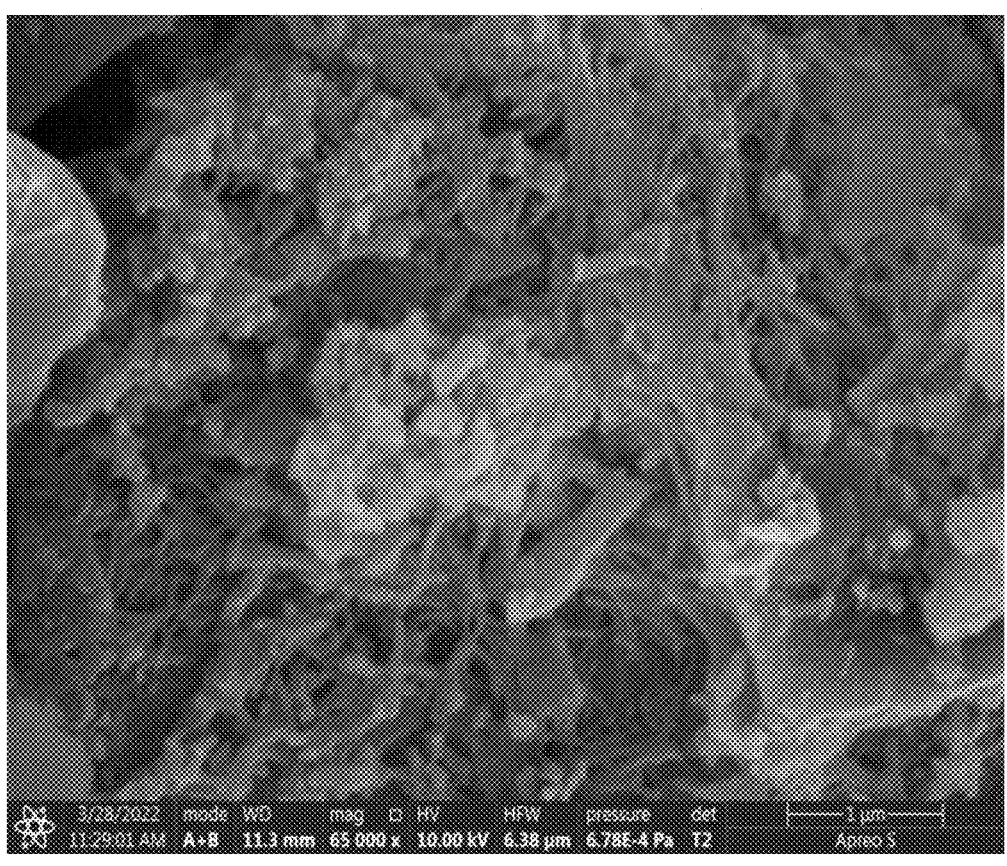
FIG. 2B is a SEM image of a cement concrete comprising graphene nanosheets based concrete additive (test sample), in accordance with an embodiment.

Referring to FIGS. 2A-2B, illustrates SEM (scanning electron microscope) image of the control sample and the test sample. In control sample, concrete particles are mainly rods-like structures (50-150 nm width & 200 to 800 nm length in size), irregularly shaped particles (30-100 nm in size) and nanoplates (500 to 1 micron in size) like structures. Whereas, the SEM image of the test sample depict that the structures of the concrete particles are mainly nanowires structures (20-60 nm in width, 500 nm to 1.5 microns in length) and some spherical particles (50 to 100 nm in size) along with some irregular shapes. The SEM image of the test sample also shows more interconnected wire structures, which is due presence of the PCE-Graphene nanosheets. These kinds of interconnected nanostructures give more strength to the concrete which could be the reason for the high strength of PCE-Graphene concrete than only cement concrete.

The graphene nanosheets based concrete additive of the present invention has certain advantages. The graphene nanosheet material uniformly spread along with polycarboxylate ether. Such incorporation reduces porosity and improve mechanical strength. Further, it also blocks the hollow space within the concrete and reduces water absorption and water permeability. Depending on the percentage of graphene nanosheets being used, the setting time and curing time of the concrete will be reduced and even the durability of the concrete structure will also be increased. The usage of graphene nanosheets based concrete additive also reduces the corrosion effect on the concrete.

Further, the additive of the present invention acts a shielding against an electromagnetic interference and gamma radiation.

The processes described above are described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A method for preparing graphene-nanosheets based concrete additive, the method comprising:

a) mixing Polycarboxylate ether-A (PCE-A) to a retarder-based salt solution to obtain a retarder-based Polycarboxylate ether-A (PCE-A) solution;

b) adding Polycarboxylate ether-B (PCE-B) to the retarder-based Polycarboxylate ether-A (PCE-A) solution to obtain a retarder-based Polycarboxylate ether (PCE) solution;

c) mixing graphene-nanosheets to the retarder-based Polycarboxylate ether (PCE) solution to obtain graphene-nanosheets based PCE solution; and d) adding at least one air entrainment agent to the graphene-nanosheets based PCE solution obtained at step c to obtain the graphene-nanosheets based concrete additive, wherein the retarder-based salt solution is obtained by mixing at least one retarder with water, wherein the weight percentage of the retarder is chosen between 3% and 5% of the total amount of water.

2. The method for preparing the graphene-nanosheets based concrete additive according to claim 1, wherein the at least one retarder and water are mixed at a speed chosen between 600-800 rpm (rotation per minute) for a time period chosen between 10 minutes and 15 minutes.

3. The method for preparing the graphene-nanosheets based concrete additive according to claim 1, wherein the retarder-based salt solution and the PCE-A are mixed at a speed chosen between 1200 rpm and 1500 rpm (rotation per minute) for a time period chosen between 10 minutes and 15 minutes.

4. The method for preparing the graphene-nanosheets based concrete additive according to claim 1, wherein the weight percentage of the PCE-A is chosen between 20% and 25% of the retarder-based salt solution.

5. The method for preparing the graphene-nanosheets based concrete additive according to claim 1, wherein the Polycarboxylate ether-B (PCE-B) and the retarder-based Polycarboxylate ether-A (PCE-A) are mixed at a speed chosen between 1700 rpm and 2000 rpm (rotation per minute) for a time period chosen between 10 minutes and 15 minutes.

6. The method for preparing the graphene-nanosheets based concrete additive according to claim 1, wherein the amount of the PCE-B ranges between 30% and 40% of the total amount of the retarder-based Polycarboxylate ether-A (PCE-A) solution.

7. The method for preparing the graphene-nanosheets based concrete additive according to claim 1, wherein the weight percentage of the graphene-nanosheets is chosen between 0.5% and 5% of the retarder-based PCE solution.

8. The method for preparing the graphene-nanosheets based concrete additive according to claim 1, wherein the graphene-nanosheets and the retarder-based PCE solution are mixed in a shear mixer at a speed chosen between 2500 rpm and 3000 rpm (rotation per minute) for a time period chosen between 30 minutes and 45 minutes.

9. The method for preparing the graphene-nanosheets based concrete additive according to claim 1, wherein the air entrainment agent is added to the graphene-nanosheets based PCE solution after 45 minutes of the mixing of the graphene-nanosheets to the PCE solution.

10. The method for preparing the graphene-nanosheets based concrete additive according to claim 1, wherein the weight percentage of the air entrainment agent is chosen between 0.5% and 1% of the graphene-nanosheets based PCE solution.

11. The method for preparing the graphene-nanosheets based concrete additive according to claim 1, wherein the air entrainment agent and the graphene-nanosheets based PCE solution are mixed at a speed chosen between 2000 rpm and 2300 rpm (rotation per minute) for a time period chosen between 5 minutes and 10 minutes.

12. The method for preparing the graphene-nanosheets based concrete additive according to claim 1, wherein the surface area of the graphene-nanosheets is between 320 $m^2$/g and 550 $m^2$/g.

13. An additive for concrete comprising:

Polycarboxylate ether-A (PCE-A), Polycarboxylate ether-B (PCE-B), graphene-nanosheets, and at least one retarder, wherein:

at least one retarder is mixed with water to obtain a retarder-based salt solution, wherein the weight percentage of the retarder is chosen between 3% and 5% of total amount of water;

the Polycarboxylate ether-A (PCE-A) is mixed with the retarder-based salt solution to obtain a retarder-based Polycarboxylate ether-A (PCE-A) solution;

the Polycarboxylate ether-B (PCE-B) is added with the retarder-based Polycarboxylate ether-A (PCE-A) solution to obtain a retarder-based Polycarboxylate ether (PCE) solution; and the graphene-nanosheets are mixed with the retarder-based Polycarboxylate ether (PCE) solution to obtain graphene-nanosheets based PCE solution.

14. The additive for concrete according to claim 13, wherein the weight percentage of the PCE-A is chosen between 20% and 25% of the retarder-based salt solution.

15. The additive for concrete according to claim 13, wherein the weight percentage of the PCE-B ranges between 30% and 40% of the total amount of the retarder-based Polycarboxylate ether-A solution.

16. The additive for concrete according to claim 13, wherein the weight percentage of the graphene-nanosheets is chosen between 0.5% and 5% of the retarder-based Polycarboxylate ether (PCE) solution.

17. The additive for concrete according to claim 13, wherein the additive comprises at least one air entrainment agent, wherein the weight percentage of the air entrainment agent is chosen between 0.5% and 1% of the graphene-nanosheets based PCE solution.

* * * * *